United States Patent
Lees et al.

(10) Patent No.: US 7,568,057 B2
(45) Date of Patent: Jul. 28, 2009

(54) METHOD AND APPARATUS FOR MAINTAINING SYNCHRONIZATION OF AUDIO IN A COMPUTING SYSTEM

(75) Inventors: Jeremy J. Lees, Beaverton, OR (US); Paul S. Diefenbaugh, Portland, OR (US); Pradeep Sebestian, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 175 days.

(21) Appl. No.: 11/642,320

(22) Filed: Dec. 19, 2006

(65) Prior Publication Data

US 2008/0147917 A1 Jun. 19, 2008

(51) Int. Cl.
- G06F 13/12 (2006.01)
- G06F 13/38 (2006.01)
- G06F 3/00 (2006.01)
- H04R 5/00 (2006.01)
- H04B 1/00 (2006.01)
- G10H 7/00 (2006.01)

(52) U.S. Cl. .............. 710/52; 381/22; 381/23; 381/119; 700/94; 715/716; 84/601; 84/602; 84/605

(58) Field of Classification Search ............... None
See application file for complete search history.

(56) References Cited

U.S. PATENT DOCUMENTS

| | | | | |
|---|---|---|---|---|
| 5,996,031 | A * | 11/1999 | Lim et al. | 710/52 |
| 7,370,125 | B2 * | 5/2008 | Bogin et al. | 710/52 |
| 2003/0112758 | A1 * | 6/2003 | Pang et al. | 370/235 |

OTHER PUBLICATIONS

Pending U.S. Appl. No. 11/502,823, filed Aug. 10, 2006 Inventor: Jeremey L. Lees.

* cited by examiner

Primary Examiner—Henry W. H. Tsai
Assistant Examiner—Michael Sun
(74) Attorney, Agent, or Firm—Blakely, Sokoloff, Taylor & Zafman LLP

(57) ABSTRACT

A new audio playback architecture may be used, which allows the use of much larger buffering than that used by a typical audio subsystem in a computing system to improve power efficiency of the system and at the same time allows to maintain the quality (e.g., fidelity and responsiveness) of the audio playback. The audio controller in the new architecture may be made to report back to the host system a more accurate indication of which audio frame is being set to the audio codec than a currently available audio controller does. Additionally, the controller is capable of re-fetching previously buffered (but not yet transmitted) data. Furthermore, the controller may dynamically adjust the size of its local buffer.

24 Claims, 6 Drawing Sheets

METHOD AND APPARATUS FOR MAINTAINING SYNCHRONIZATION OF AUDIO IN A COMPUTING SYSTEM

BACKGROUND

1. Field

This disclosure relates generally to multimedia applications in a computing system, and more specifically but not exclusively, to method and apparatus for maintaining synchronization of audio during audio playback.

2. Description

Most of today's computing platforms are not very efficient in the way they execute various audio workloads, which results in more power consumption compared to fixed-function devices such as cellular phones and MP3 players. One reason for this inefficiency may be due to the lack of robust hardware buffering which limits the amount of time the audio controller's Direct Memory Access (DMA) engines can remain idle before needing to service the audio workload. Without the capability for robust hardware buffering, a system may be forced to favor either audio quality (e.g., fidelity and responsiveness) or reduction of power consumption. In a typical computing system nowadays, both objectives cannot be achieved simultaneously. For example, on one hand, some Operating Systems (OS) uses relatively small audio buffers (e.g., only capable for buffering 40-80 milliseconds of audio), but tries to achieve high audio quality in terms of fidelity and responsiveness. On the other hand, some hardware audio controller uses a very small hardware buffer (e.g., only capable for buffering a few microseconds worth of low-fidelity audio). The combination of software and hardware buffering components results in frequent bus-mastering DMA and processor interrupts which in turn significantly increases platform power consumption and precludes the use of advanced power management techniques in the future.

Although more power-efficient audio playback may be achieved by buffering larger amounts of audio data (in the OS as well as the hardware audio controller), this approach, by itself, may increase the end-to-end latency. Typically, the maximum acceptable delay for audio before a user may detect audible side-effects is 100-150 ms (for a single event). This latency is measured from the time an event causing a sound to be sent to the audio subsystem to the time the sound is actually rendered at the speaker. Certain types of audio workloads such as VoIP (Voice over Internet Protocol) may have even more stringent latency requirement to account for possible external delays such as those occurring during network propagation. Other workloads like movie playback require fairly stringent synchronization between audio and video feeds. Therefore, it is desirable to design an audio subsystem in a computing system which can achieve both objectives of good quality and low power consumption.

BRIEF DESCRIPTION OF THE DRAWINGS

The features and advantages of the disclosed subject matter will become apparent from the following detailed description of the subject matter in which.

DETAILED DESCRIPTION

According to embodiments of the subject matter disclosed in this application, a new audio playback architecture may be used, which allows the use of much larger buffering than that used by a typical audio subsystem in a computing system to improve power efficiency of the system and at the same time allows to maintain the quality (e.g., fidelity and responsiveness) of the audio playback. The amount of buffering throughout the audio stack in a computing system may vary from potentially minutes in main memory to tens or hundreds of milliseconds in the audio controller. Additionally, the audio controller may be made to report back to the host system a more accurate indication of which audio frame is being set to the audio codec than a currently available audio controller does. Moreover, the controller will be capable of re-fetching previously buffered (but not yet transmitted) data. Furthermore, the controller may dynamically adjust the size of its local buffer.

Reference in the specification to "one embodiment" or "an embodiment" of the disclosed subject matter means that a particular feature, structure or characteristic described in connection with the embodiment is included in at least one embodiment of the disclosed subject matter. Thus, the appearances of the phrase "in one embodiment" appearing in various places throughout the specification are not necessarily all referring to the same embodiment.

Figure 1:
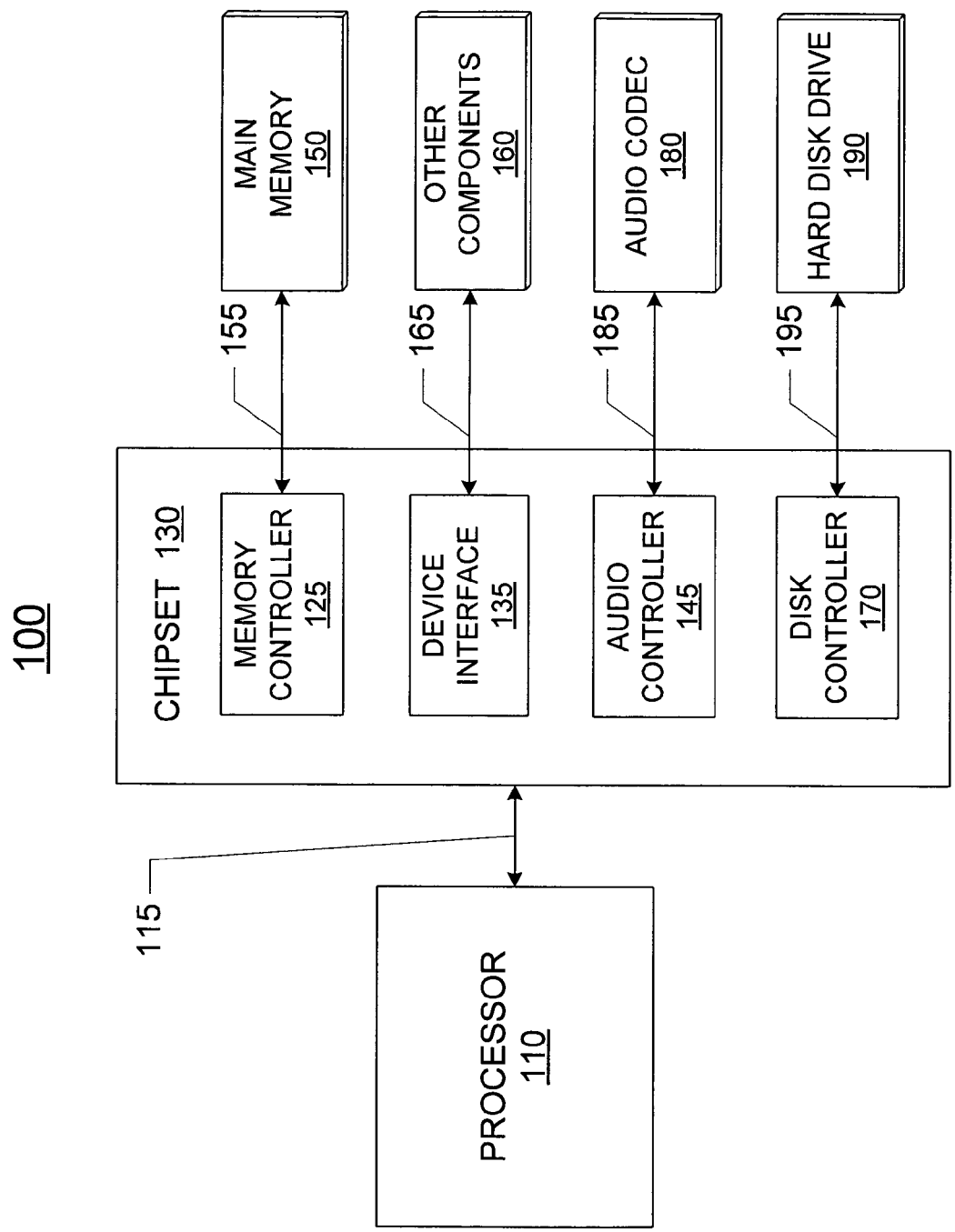
FIG. 1 shows one example computing system where new audio playback architecture with large sizes of buffers may be used for improving power efficiency without sacrificing the quality of audio playback.

FIG. 1 shows one example computing system 100 where new audio playback architecture with large sizes of buffers may be used for improving power efficiency without sacrificing the quality of audio playback. Computing system 100 may comprise one or more processors 110 coupled to a system interconnect 115. Processor 110 may have multiple or many processing cores (for brevity of description, term "multiple cores" will be used hereinafter to include both multiple processing cores and many processing cores). The computing system 100 may also include a chipset 130 coupled to the system interconnect 115. Chipset 130 may include one or more integrated circuit packages or chips. Chipset 130 may comprise one or more device interfaces 135 to support data transfers to and/or from other components 160 of the computing system 100 such as, for example, keyboards, mice, network interfaces, etc. The device interface 135 may be coupled with other components 160 through a bus 165. Chipset 130 may include an audio controller 145 that provides a data path between audio codec 180 and processor 110 as well as main memory 150. The audio controller 145 is coupled to the audio codec through a bus 185. Bus 185 may be a HD (High Definition)Audio bus or AC(Audio Codec)'97 bus. The audio controller 145 may be a part of a PCI Bridge (not shown in the figure). The audio codec 180 may render audio data transferred to it from the audio controller to a user. In one embodiment, the audio codec may be integrated into the chipset.

Additionally, chipset 130 may comprise a memory controller 125 that is coupled to a main memory 150 through a memory bus 155. The main memory 150 may store data and sequences of instructions that are executed by multiple cores of the processor 110 or any other device included in the system such as audio codec 180. The memory controller 125 may access the main memory 150 in response to memory transactions associated with multiple cores of the processor 110, and other devices in the computing system 100. In one embodiment, memory controller 125 may be located in processor 110 or some other circuitries. The main memory 150 may comprise various memory devices that provide addressable storage locations which the memory controller 125 may read data from and/or write data to. The main memory 150 may comprise one or more different types of memory devices such as Dynamic Random Access Memory (DRAM) devices, Synchronous DRAM (SDRAM) devices, Double Data Rate (DDR) SDRAM devices, or other memory devices.

Moreover, chipset 130 may include a disk controller 170 coupled to a hard disk drive (HDD) 190 (or other disk drives not shown in the figure) through a bus 195. The disk controller allows processor 110 to communicate with the HDD 190. In some embodiments, disk controller 170 may be integrated into a disk drive (e.g., HDD 190). There may be different types of buses coupling disk controller 170 and HDD 190, for example, the advanced technology attachment (ATA) bus and PCI Express (PCI-E) bus.

Figure 2:
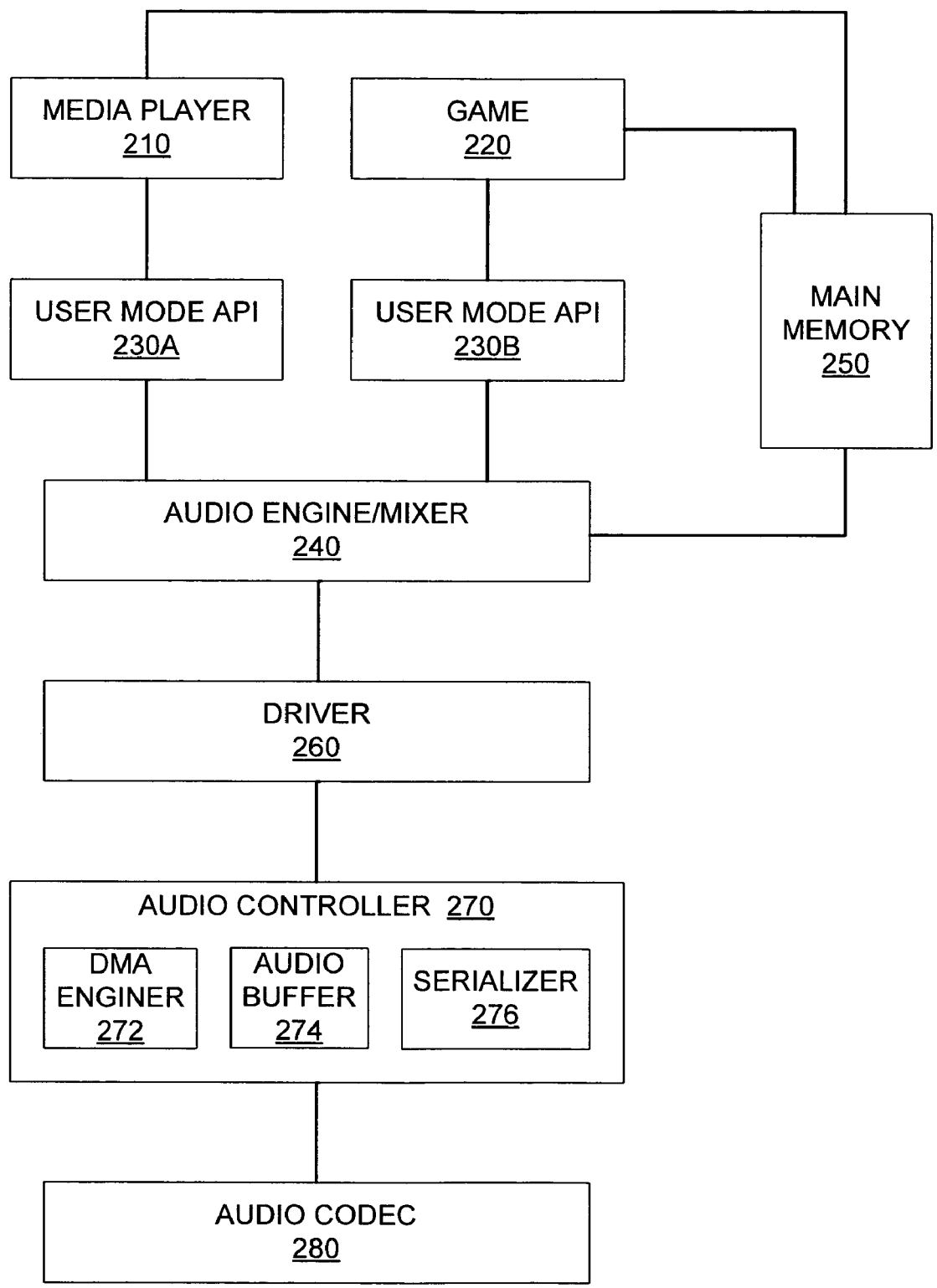
FIG. 2 is a diagram of an example audio subsystem in a computing system according to the subject matter disclosed in this application.

An OS (not shown in the figure) may run in processor 110 to control the operations of the computing system 100. The OS may facilitate other software/hardware applications such as a media player application (not shown in the figure) to run in system 100. An application such as a media player may play audio data (e.g., MP3 music), which may be primarily stored in HDD 190. The OS or other components (e.g., driver 260 as shown in FIG. 2) may set up a buffer in main memory 150 (hereinafter "memory buffer") for the application to store a portion of the audio data to be played so that it is not necessary to always access HDD 190 for more data. Access latency to the HDD is typically much higher than access latency to main memory. The size of the memory buffer in the main memory may be determined by several factors including the size of the main memory, use of the main memory by other applications, and so on. If possible, the size of the memory buffer should be big enough to reduce the amount of audio data traffic between the HDD and the main memory and hence improve power efficiency. In practice, it is not technically difficult to increase the size of the memory buffer as the capacity of the main memory is generally increasing for many computing systems.

When an application (e.g., a media player) starts to play a piece of audio data, with the help of the OS, the application sends audio data in the memory buffer to audio controller 145, which transmits the data to audio codec 180 for rendering to a user. To reduce audio data traffic between the main memory and the audio controller (and thus improve power efficiency) and to achieve real-time rendering of the audio data, the audio controller typically includes a buffer (hereinafter "controller buffer") (not shown in the figure), a direct memory access (DMA) engine (not shown in the figure), and a serializer (not shown in the figure). When the application starts to play, the DMA engine transfers audio data from the memory buffer to fill the controller buffer, and continues such data transfer whenever the amount of data in the controller buffer is reduced to a certain degree throughout the entire process of playback. The serializer serializes audio data in the controller buffer and sends the serialized data to the audio codec through bus 185. In one embodiment, the audio controller might not have a serializer and may transmit data to the audio codec in parallel through bus 185.

In one embodiment, the controller buffer may be located within the audio controller. In another embodiment, the controller buffer may be located outside the audio controller but is accessible by the audio controller. The size of the controller buffer may be determined by several factors including fidelity, responsiveness, amount of traffic between the audio controller and the main memory, cost, and so on. A large controller buffer helps reduce the traffic between the audio controller and the main memory and thus improves power efficiency. A large controller buffer is also helpful to achieve high fidelity playback. However, when another application (e.g., a game) also plays another piece of audio data while one application (e.g., media player) is playing one piece of audio data, the audio controller typically depletes the data in the controller buffer before serving the needs of another application by transferring data for another application to the controller buffer. If the controller buffer is too large, it may takes a long time to deplete the audio buffer and the delay so caused may be too long to be acceptable by a user. To achieve both high power efficiency and responsiveness, it is desirable to have a large controller buffer while still maintaining good responsiveness.

According to an embodiment of the subject matter disclosed in this application, the audio controller may be modified to have access to a local buffer (i.e., controller buffer) which is much larger than that used in a typical audio subsystem today to allow audio playback for long periods of time without needs to access main memory. Additionally, controller may also be required to report back to the host system a more accurate indication of which audio frame is being sent to the audio codec than a currently available audio controller does. Moreover, the controller will be capable of re-fetching previously buffered (but not yet transmitted) data. Furthermore, the controller may dynamically adjust the size of the controller buffer.

FIG. 2 is a diagram of an example audio subsystem 200 in a computing system according to the subject matter disclosed in this application. Audio subsystem 200 includes several layers of hardware and software, each responsible for a specific aspect of rendering multiple audio streams. Media player 210 and game 220 are two example high level applications which may play audio to a user, and they belong to an application layer. Applications in the application layer may decode/decompress original audio data to a common format (e.g., PCM (Pulse Coding Modulation) format) to be passed to the next layer. At least a portion of the original audio data may be stored in main memory 250 so that the applications do not need to constantly read data from a hard disk.

The next layer may include audio engine/mixer 240 and driver 260. Media player 210, game 220, or other application provides portions of whole sounds to be rendered, which are in the common format, to Audio engine/mixer 240 through a User Mode API (e.g., 230A and 230B). Audio engine/mixer 240 may include one or more buffers, each for one application to store the portion of a sound it provides. The temporal size of each buffer may be in the order of 10's of milliseconds. The Audio Engine/Mixer may mix portions of sounds from different applications and apply global effects to the resulting mixed audio stream. The audio engine/mixer may store the processed data in a buffer to be passed to driver 260. The driver may accept the processed audio data from the buffer and place the processed audio data into a buffer in main memory 250 ("memory buffer") so that audio controller 270 may DMA the processed audio data from the buffer in the main memory into the audio controller's local hardware buffer ("controller buffer"). The memory buffer may be a cyclic buffer created by driver 260, from which the DMA engine 272 in audio controller 270 may continuously cycle through to keep the controller buffer full. Additionally, driver 260 may be notified by audio controller 270 that a portion of the cyclic memory buffer has been read by the DMA engine through an interrupt. Driver 260 may coordinate among different components in the audio subsystem and be implemented using software, hardware, or a combination of both.

Audio controller 270 and audio codec 280 may form a hardware layer in audio subsystem 200. Audio controller 270 may include a DMA engine 272, an audio buffer 274 ("controller buffer"), and a serializer 276. DMA engine 272 may DMA audio data from memory buffer to the controller buffer. Serializer 276 serializes audio data from the controller buffer and passes it to audio codec 280 for rendering to a user. In one embodiment, audio controller 270 might not have a serializer and the audio controller may send audio data from the controller buffer to audio codec 280 in parallel. In a typical existing audio subsystem, the size of the controller buffer is normally very small and the DMA engine has to frequently transfer data from the memory buffer to fill the controller buffer. Such frequent data transfer activates many components in a computing system including buses, interfaces, and memory controller, etc., and thus is not efficient in power consumption. Additionally, a typical existing audio subsystem follows a top down model in which all the audio content moves from an application to the audio codec with little or no feedback from the lowest level to the top or intermediate levels. Moreover, the DMA engine in a typical existing audio subsystem does not have the ability to invalidate contents in the controller buffer or the ability to re-gather audio data that has been modified by the above stack after the DMA engine has been dispatched to render the data. Furthermore, the audio controller in a typical existing audio subsystem does not have the ability to dynamically manage the size of the controller buffer.

According to an embodiment of the subject matter disclosed in this application, audio controller 270 in audio subsystem 200 may have a large controller buffer. This enables the audio controller to remain self-sufficient for a longer period of time compared to an audio controller that has a small controller buffer. As a result, power consumption of the whole system may be reduced because the audio controller does not need to activate many other components in the system to DMA audio data from the memory buffer to the controller buffer as frequently. Additionally, the audio controller may report back through driver 260 to components in the upper layer of the audio subsystem a more accurate indication of which audio frame is being sent to audio codec 280 by using a link position in buffer (LPIB) pointer, which is referenced to the cyclic memory buffer. Moreover, the OS and/or driver 260 may detect the occurrence of an event that needs to play a new sound to a user while the audio codec is rendering another sound to the user; and enable the DMA engine in the audio controller to invalidate contents in the controller buffer and re-fetch audio data previously buffered but has been modified by the above stack. Furthermore, the audio controller may be able to dynamically adjust the size (or depth) of the controller buffer to accommodate needs of different applications, with help from driver 260.

Figure 3:
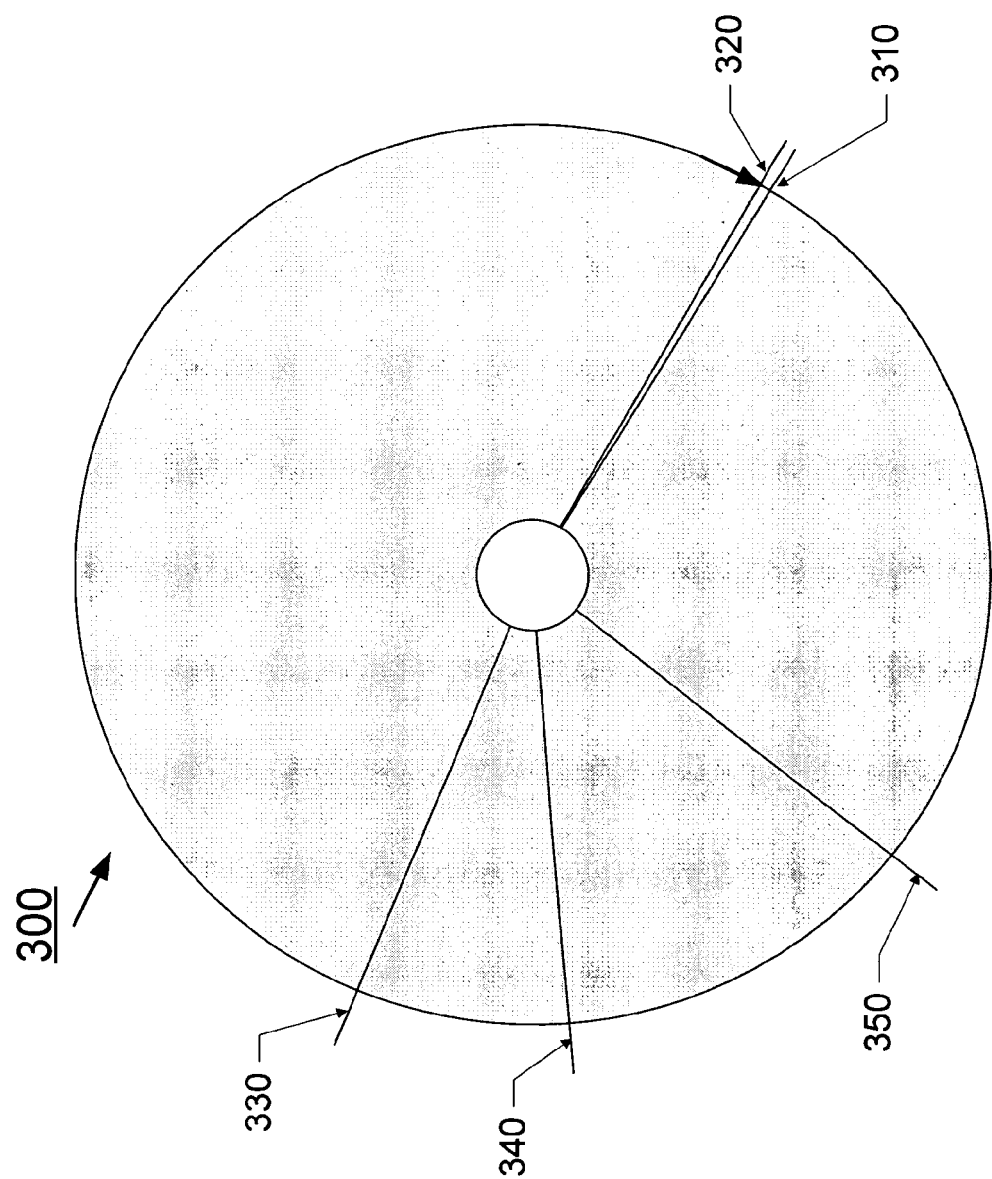
FIG. 3 illustrates an example memory buffer for audio data to be sent to a local buffer of an audio controller.
Figure 4:
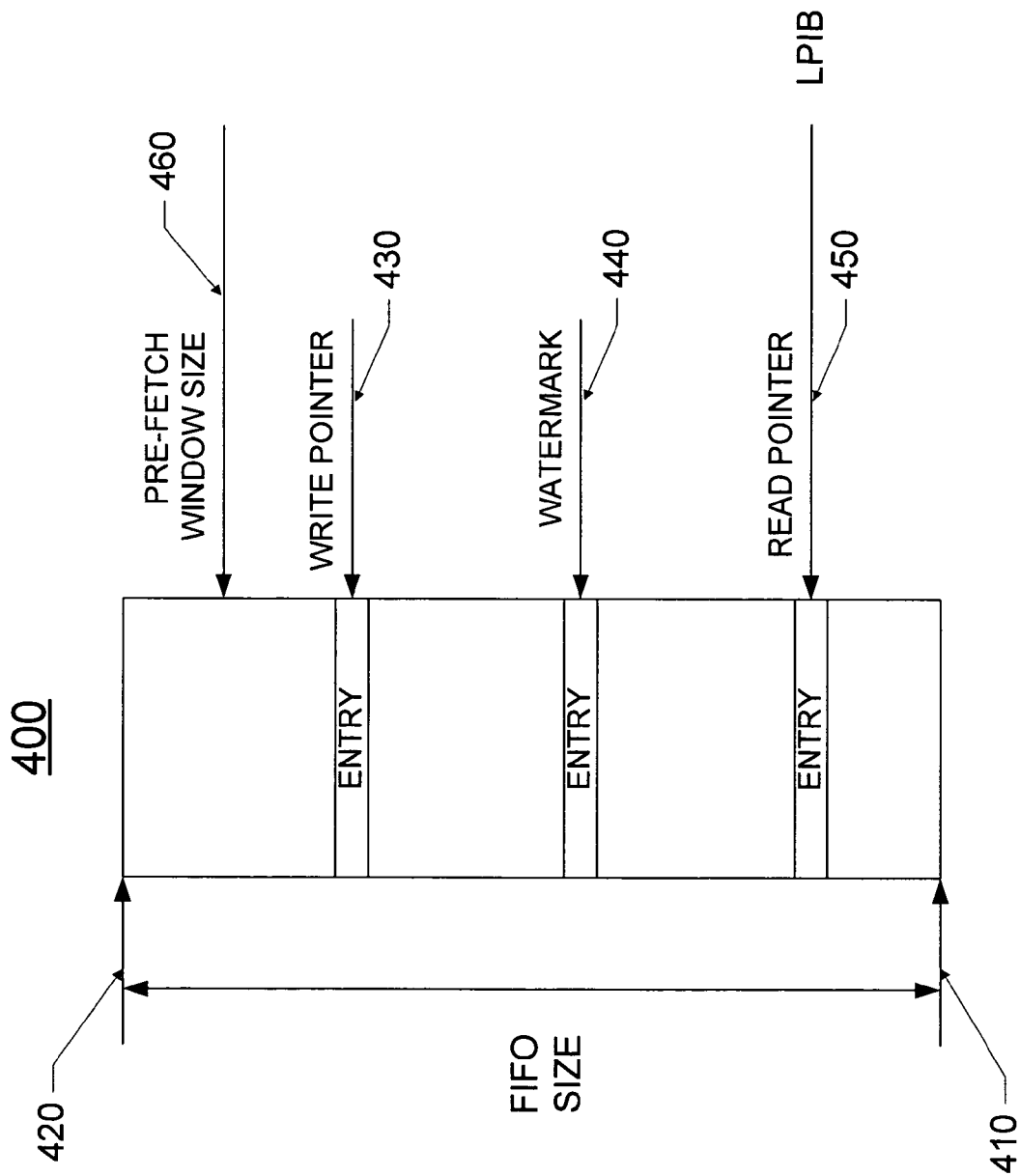
FIG. 4 illustrates an example controller buffer (local buffer of audio controller) for audio data to be played by an audio codec.

FIG. 3 illustrates an example memory buffer 300 for audio data to be sent to a local buffer of an audio controller. The DMA engine in the audio controller (e.g., audio controller 270 in FIG. 2) transfers audio data from memory buffer to a controller buffer (e.g., audio buffer 274 in FIG. 2). Typically, a memory buffer is a cyclic buffer such as memory buffer 300 as shown in the figure. Memory buffer may be flat like memory buffer 300 or described by a buffer descriptor list. The DMA engine repeatedly processes the cyclic buffer. In memory buffer 300, the DMA engine starts at base address 310 and pulls data out of memory buffer 300 until it reaches buffer end 320, which is described by the buffer Length and is right next to the base address. For the illustration purpose, a small gap is shown between base address 310 and buffer end 320, but in reality there is really no gap in between. The DMA engine has a memory buffer read pointer 330, which has the same data as controller buffer write pointer 430 as shown in FIG. 4. FIG. 3 also shows relative positions in the memory buffer of controller buffer watermark 340 and controller buffer read pointer 350, which are described in more detail along with FIG. 4.

FIG. 4 illustrates an example controller buffer 400 (local buffer of audio controller) for audio data to be played by an audio codec. Controller buffer 400 is shown as a First In First Out (FIFO) buffer. In another embodiment, a controller buffer may be other types of buffer (e.g., First In Last Out (FILO) buffer). Write pointer 430 is used by the DMA engine to write audio data fetched from the memory buffer into controller buffer 400. Write pointer 430 points to an address where the last writes to controller buffer ends. Write pointer 430 corresponds to memory buffer read pointer 330 (as shown in FIG. 3) used by the DMA engine to read from the memory buffer. Watermark 440 is an offset measured from write pointer 430. The offset here will be referred to as watermark size hereinafter. Read pointer 450 is used by an audio controller to read data out of controller buffer 400. When read pointer 450 is equal to or passes watermark 440, the DMA engine is triggered to refill controller buffer 400. Watermark 430 is configurable setting to control when the DMA engine needs to refill the controller buffer. It represents a safe amount of time to ensure that the DMA engine would have enough time to refill controller buffer 400 before read pointer 450 reaches write pointer 430 considering memory access latencies that may be encountered when fetching data from main memory. Write pointer 430, watermark 440, and read pointer 450 may be stored in registers.

According to an embodiment of the subject matter disclosed in this application, controller buffer 400 may be larger than one in a typical audio controller available today so that the audio subsystem may remain self sufficient for a longer period of time. As a result, the audio controller will not need to use the backbone, interface or main system memory controller, and memory as frequently. This may directly improve power efficiency.

Additionally, the audio controller may report back to upper layers of the audio subsystem which frame in the memory buffer is sent to the audio codec, i.e., the relative position of read pointer 450 in the memory buffer. With such information, audio applications (e.g., media player 210 or game 220 in FIG. 2) and/or audio engine/mixer (e.g., 240 in FIG. 2) may accurately replace data in the memory buffer that has been sent to the audio codec with new audio data. A hardware register may be used to fulfill this reporting function and is accessible by components in upper layers of the audio systems. The hardware register records the Link Position In Buffer (LPIB), which is referenced to the memory buffer and is the same as the read pointer in the controller buffer. The LPIB may be calculated by subtracting the absolute value of the difference between the controller buffer read and write pointers from the value of an offset counter (not shown in the figure) in the DMA engine. The offset counter records how much the controller buffered is filled with valid audio data. In calculating the LPIB, some additional checking may need to be done to ensure that the absolute value of the difference between the two pointers is not larger than the value of the offset counter. If this is indeed the case, calculation would be done by subtracting the value of the offset counter and the pointer difference from the buffer length to determine the LPIB.

Moreover, to maintain a deep controller buffer, the audio controller may need to have the ability to re-fetch data from the memory buffer that has already been transferred to the controller buffer. For example, if the controller buffer is greater than a size equivalent to 100 mini-second ("ms") audio data and a user driven event occurs that requires a sound to be rendered, the audio in the controller buffer needs to be updated so that the sound is rendered in less than 100 ms. An example would be playing back an MP3 on a cell phone. While the MP3 is playing, the user presses a number on the key pad to dial a phone number. The key press requires that a tone be rendered by the system. If the controller buffer is over 100 ms long, the tone will not be heard until the buffer is depleted, updated, and rendered, which would not meet the responsiveness requirement.

The ability to re-gather or re-fetch remixed audio data may resolve this issue. The DMA engine may be forced to re-gather by writing to a register in the audio controller causing the DMA engine to re-gather. The register write forces the watermark pointer and the controller buffer write pointer to be updated. The controller buffer write pointer is set to a value that is equal to the controller buffer read pointer plus the watermark size; and the watermark pointer is set equal to the read pointer. When the read pointer is equal to the watermark pointer, the DMA engine is triggered to refill the controller buffer.

The DMA engine then needs to calculate a new memory buffer read address or be provided with a new memory read address. If the cyclic memory buffer in memory is simply described with a base address and length, the offset counter of the DMA engine may be reloaded. The reloaded value would be the current offset counter value minus the absolute difference between the watermark pointer and controller buffer read pointer. Some additional checking may need to be done to ensure that the absolute value of the difference between the two pointers is not larger than the value of the offset counter. If this is indeed the case, calculation would be done by subtracting the value of the offset counter and the pointer difference from the buffer length to determine the reloaded value.

If the cyclic memory buffer in main memory is described by a buffer descriptor list, the DMA engine will be responsible for caching descriptors until the complete buffer is rendered. The new memory address would have to be mapped to the correct descriptor based upon its length and base address.

As illustrated by FIG. 4, FIFO size ("FS") is the maximum controller buffer size between base address 410 and top address 420, which is discoverable by software. Pre-Fetch Window Size ("PFWS") 460 is the maximum amount of data the DMA engine is allowed to have in the controller buffer, and is equal to or less than the FS. PFWS 460 may be dynamically modified while the DMA engine is enabled. When PFWS 460 transitions from a small to a larger size, the available space in the controller buffer for a DMA engine to store audio data increases. When the read pointer reaches the watermark, the DMA engine will perform the data transfer from the memory buffer to the controller buffer as it normally does. This time the DMA engine will fetch a larger amount of data to fill the buffer to the PFWS threshold. Note that this does not preclude the DMA engine from opportunistically filling the controller buffer when space is available.

When PFWS 460 transitions from a large to a smaller size, the controller buffer may be holding more data than is allowed by the PFWS. In one embodiment, the DMA engine may enact the new PFWS on the next watermark-induced DMA transfer from memory buffer to the controller buffer. Thus the data already buffered will be rendered. In another embodiment, the data outside the bounds of the PFWS may be flushed. This may be achieved by moving the write pointer to the new PFWS boundary. The DMA engine then would be required to re-calculate its read address in the memory-buffer, which would be LPIB+PFWS (which needs to be translated into a memory address based upon a descriptor in a descriptor based system). Thus the data already buffered but outside of the new PFWS would essentially be invalidated.

Figure 5:
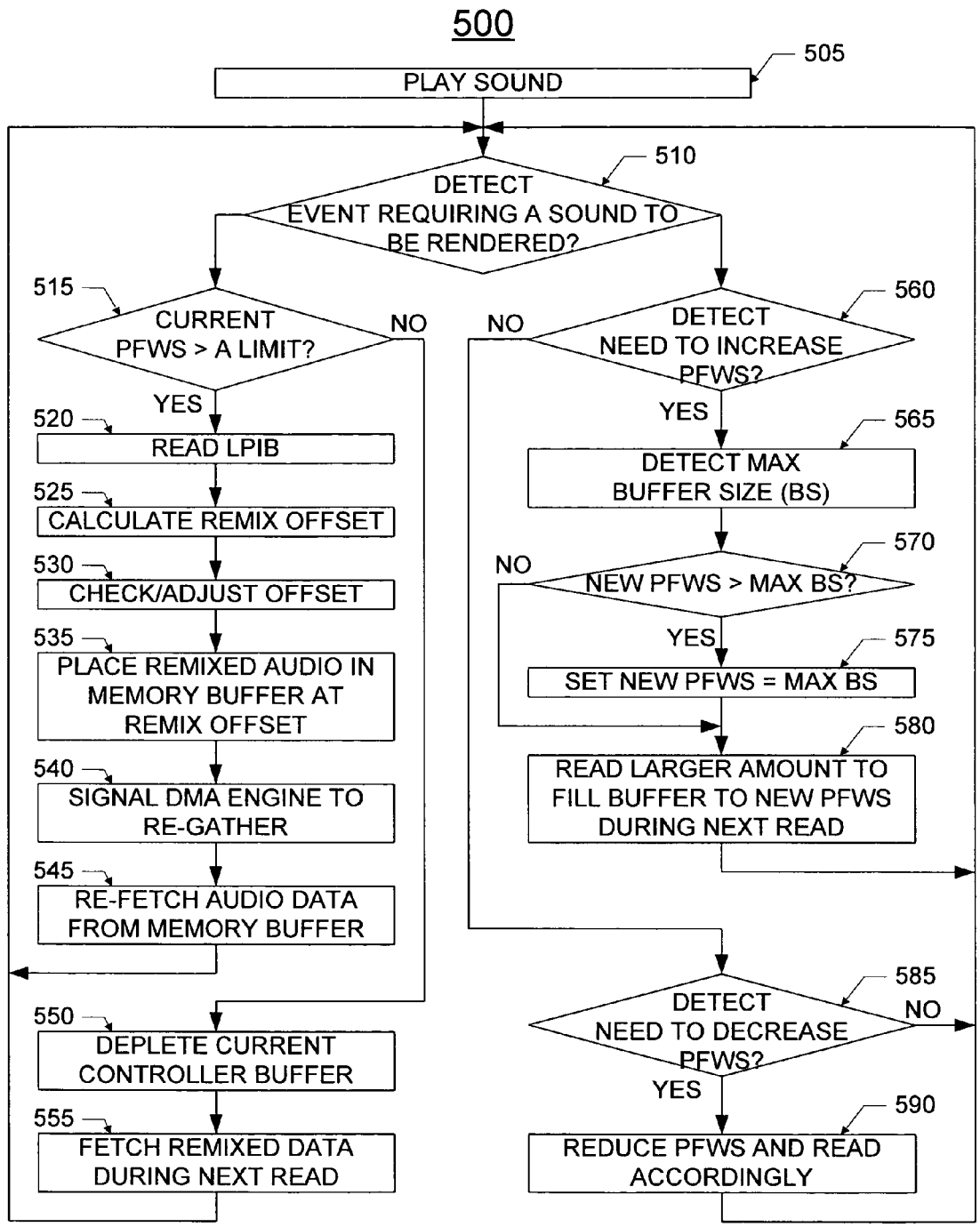
FIG. 5 is a flowchart of an example process for playing audio data with an audio subsystem in a computing system having a large buffer in the audio controller.

FIG. 5 is a flowchart of an example process 500 for playing audio data with an audio subsystem in a computing system having a large buffer in the audio controller. The large controller buffer may enable the audio controller to remain self-sufficient for a relatively long time without accessing main memory. At block 505, the audio subsystem may play a sound to a user. At block 510, the computing system may detect whether any event occurs that requires a new sound that is different from the currently playing sound to be rendered. Using an example given above, a user presses a number on the key pad to dial a phone number using a cell phone (which is a computing system) while an MP3 is playing. A tone is required to be rendered while a key is pressed. If such an event is detected at block 510, a further decision whether the current pre-fetch window size ("PFWS") is larger than a predetermined limit may be made at block 515. This predetermined limit is an amount of audio data, if which were rendered by the audio codec before rendering the new sound a user would be able to perceive an obvious delay. For example, this predetermined limit may be equivalent to 100 ms audio data. It is possible that the actual data left to be played in the controller buffer is smaller than the predetermined limit. Thus, in one embodiment, a decision whether the amount of audio data left in the controller buffer to be rendered by an audio codec is larger than the predetermined limit may be made at block 515. The amount of data left to be played in the controller buffer may be determined based in part on the current pre-fetch window size ("PFWS") and the position of the read pointer. If the answer from the block 515 decision is positive, the DMA engine in the audio controller may need to re-gather or re-fetch data from the memory buffer via operations in blocks 520 through 545.

Figure 6:
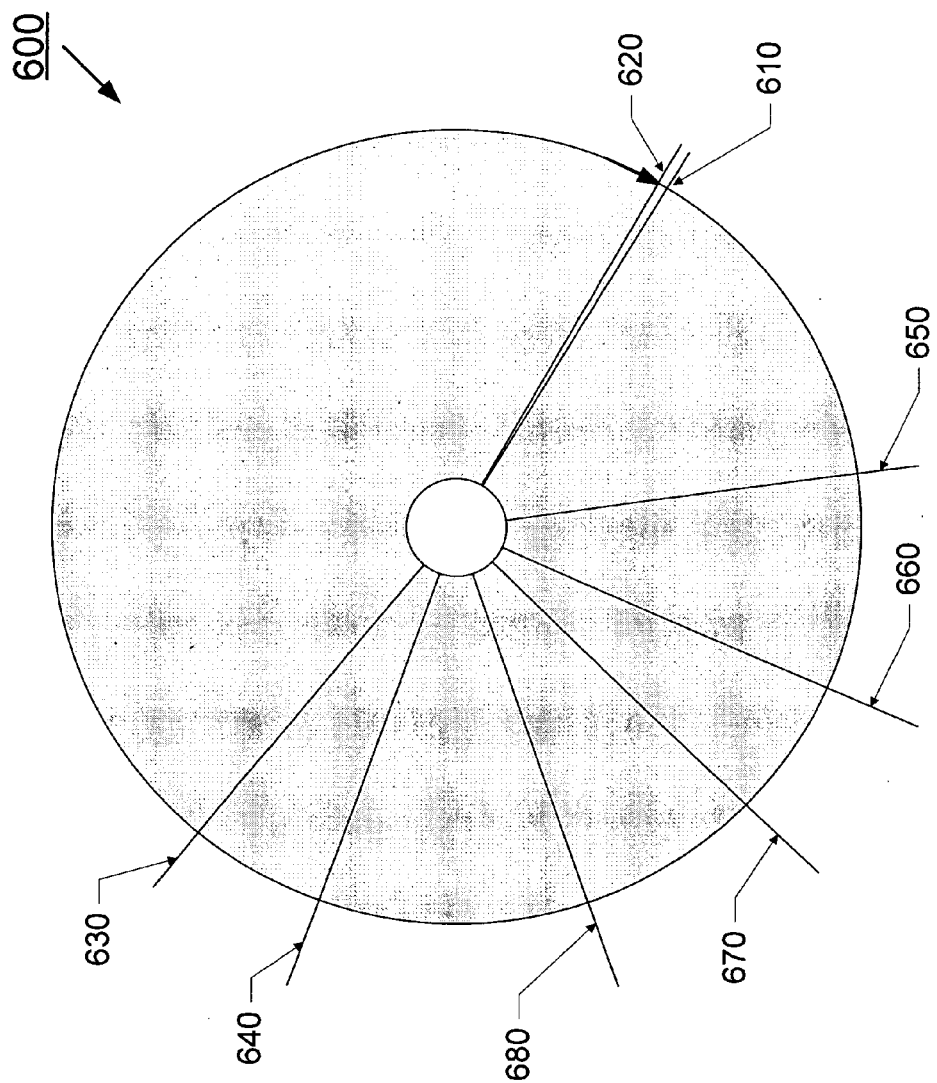
FIG. 6 illustrates another example memory buffer for audio data to be sent to a controller buffer.

For the convenience of description, an example cyclic memory buffer 600 is illustrated in FIG. 6 to show the re-fetching process. At block 520, the LPIB may be read by a driver (e.g., 260 in FIG. 2) to determine relatively where in the memory buffer the audio controller is rendering. At block 525, the driver may calculate a remix offset—a point far enough ahead in the audio stream to safely remix the audio stream. The remix offset 680 is shown in FIG. 6. The Remix offset is the point at which the audio engine/mixer (e.g., 240 in FIG. 2) will mix in the audio stream of the new sound. The value of the remix offset may be obtained by adding an offset (which should be big enough to ensure that there is enough time to remix the audio stream and no remixed audio stream will be missed when the DMA engine is ready to re-fetch the remixed audio stream) to the LPIB. Once the remix offset is determined, the watermark for re-fetching 660 may be proximately determined. Accordingly, the memory buffer read pointer for re-fetching 670 may be determined by adding the watermark size to the re-fetching watermark 660. The base address and the end address of memory buffer 600 are shown as 610 and 620, respectively. Watermark and buffer memory read pointer before re-fetching are shown as 640 and 630, respectively.

Turning back to FIG. 5, at block 530, the remix offset calculated at block 525 may be checked to determine whether it is larger than the LPIB plus the watermark size. If it is not, the remix offset may be adjusted to be equal to the LPIB plus the watermark size. At block 535, the remix offset may be written to a register; and the audio engine/mixer may start mixing audio streams of the current sound and the new sound and placing the mixed audio stream in memory buffer at the remix offset. Once the remixed audio stream has filled a portion of the cyclic memory buffer, a re-fetch may be signaled to the DMA engine at block 540. At block 545, the DMA engine may re-fetch the remixed audio stream from the memory buffer to the controller buffer.

If the decision at block 515 turns out that the current PFWS is not larger than the predetermined limit or the actual audio data left in the controller buffer is not larger than the predetermined limit, the audio controller may continue transmitting audio data in the controller buffer to the audio codec until the data in the controller buffer is depleted at block 550. Once the controller buffer is depleted, the audio engine may fetch remixed audio stream during the next watermark-induced read from the memory buffer to the controller buffer at block 555.

Once the new sound has been rendered to the user, process 500 may return to block 510 for new determination from either block 545 or block 555. If this time another event occurs which requires another new sound to be rendered to the user, the operations from blocks 515 through 555 may be performed; otherwise, a decision whether there is a need to increase the PFWS may be made at block 560. If the answer is positive, the maximum controller buffer size ("BS") may be obtained at block 565. At block 570, it may be determined whether the new increased PFWS is greater than the maximum BS. If it is, the new PFWS may be set to be equal to the maximum BS at block 575; otherwise the new PFWS is a valid new PFWS. At block 580, the audio engine may continue sending audio data in the controller buffer with the current PFWS to the audio codec until the controller buffer is depleted. At the next watermark-induced read, the DMA engine may read a larger amount of audio data from the memory buffer to fill the controller buffer to the new PFWS.

If it is determined that there is no need to increase the PFWS at block 560, it may be further determined whether there is a need to decrease the PFWS at block 585. If it is, the PFWS may be reduced at block 590. In one embodiment, the DMA engine may enact the new PFWS on the next watermark-induced DMA transfer from memory buffer to the controller buffer. Thus the data already buffered will be rendered. In another embodiment, the data already buffered but outside of the new PFWS may be flushed. This may be achieved by moving the write pointer to the new PFWS boundary. The DMA engine then would be required to re-calculate its read address in the memory buffer, which would be LPIB+PFWS (which needs to be translated into a memory address based upon a descriptor in a descriptor based system). Once the PFWS has been changed to the new PFWS or if it is determined that there is no need to change the PFWS, process 500 may return to block 510 from either block 580, block 590, or block 585.

Although the above description mainly focuses on an audio subsystem in a computing system, it is understood that the subject matter disclosed in this application can be readily used (with some or few modification) to improve the performance of a video subsystem or other multimedia subsystem in a computing system. For example, a video controller in a video subsystem may use a large local buffer to improve power efficiency while still maintaining the quality of playback by enabling the controller to re-fetch previously buffered video data and to dynamically adjust the PFWS.

Although an example embodiment of the disclosed subject matter is described with reference to block and flow diagrams in FIGS. 1-6, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus for playing audio to a user in a computing system, comprising:
   at least one audio application to provide the user an interface to play a sound;
   an audio mixer to mix portions of audio data provided by the at least one audio application, the mixed audio data being stored in a buffer in a memory of the computing system ("memory buffer");
   an audio controller to transfer the mixed audio data from the memory buffer to a buffer local to the audio controller ("controller buffer"), the controller buffer having a capacity to store enough audio data to enable the audio controller to remain self-sufficient without data transfer from the memory buffer to the controller buffer for a period of time longer than 100 milliseconds; and
   an audio codec to obtain the mixed audio data from the controller buffer and to render the mixed audio data to the user, and
   wherein the audio controller to detect an event that requires a new sound to be played that is different from a currently playing sound, wherein the audio controller further to determine, in response to the detecting the event, that an amount of data in the controller buffer is larger than a predetermined limit, and wherein the audio controller further to re-fetch from the memory buffer audio data which is previously buffered in the controller buffer but has not yet been transmitted to the audio codec, the re-fetching the audio data in response to the determining that the amount of data in the controller buffer is larger than the predetermined limit.

2. The apparatus of claim 1, wherein the audio controller comprises:
   a direct memory access ("DMA") engine to transfer the mixed audio data from the memory controller to the controller buffer, the mixed audio data being organized in frames; and
   a transmitter to send the mixed audio data in the controller buffer to the audio codec.

3. The apparatus of claim 2, further comprising a driver to set up the memory buffer, to store the mixed audio data in the memory buffer, and to coordinate among the application, the audio mixer, the audio controller, and the audio codec.

4. The apparatus of claim 3, wherein the controller is capable of reporting to the driver which audio frame is being sent to the audio codec.

5. The apparatus of claim 3, wherein the audio controller is capable of dynamically adjusting the actual buffering size of the controller buffer.

6. A computing system having an audio subsystem to play audio to a user, comprising:
   a processor;
   a main memory coupled to the processor; and
   the audio subsystem coupled to the processor and the main memory to play audio to the user, the audio subsystem including:
      at least one audio application, running on the processor, to provide the user an interface to play a sound,
      an audio mixer to mix portions of audio data provided by the at least one audio application, the mixed audio data being stored in a buffer in the main memory ("memory buffer"),
      an audio controller to transfer the mixed audio data from the memory buffer to a buffer local to the audio controller ("controller buffer"), the controller buffer having a capacity to store enough audio data to enable the audio controller to remain self-sufficient without data transfer from the memory buffer to the controller buffer for a period of time longer than 100 milliseconds, and
      an audio codec to obtain the mixed audio data from the controller buffer and to render the mixed audio data to the user; and
      wherein the audio controller to detect an event that requires a new sound to be played that is different from a currently playing sound, wherein the audio controller further to determine, in response to the detecting the event, that an amount of data in the controller buffer is larger than a predetermined limit, and wherein the audio controller further to re-fetch from the memory buffer audio data which is previously buffered in the controller buffer but has not yet been transmitted to the audio codec, the re-fetching the audio data in response to the determining that the amount of data in the controller buffer is larger than the predetermined limit.

7. The system of claim 6, wherein the audio controller comprises:
   a direct memory access ("DMA") engine to transfer the mixed audio data from the memory controller to the controller buffer, the mixed audio data being organized in frames; and
   a transmitter to send the mixed audio data in the controller buffer to the audio codec.

8. The system of claim 7, wherein the audio subsystem further comprises a driver to set up the memory buffer, to store the mixed audio data in the memory buffer, and to coordinate among the application, the audio mixer, the audio controller, and the audio codec.

9. The system of claim 8, wherein the controller is capable of reporting to the driver which audio frame is being sent to the audio codec.

10. The system of claim 8, wherein the audio controller is capable of dynamically adjusting the actual buffering size of the controller buffer.

11. A method for playing audio to a user in a computing system, comprising:
receiving a request for playing a first sound from the user;
buffering at least a portion of the first sound in a buffer in a memory of the computing system ("memory buffer");
fetching a portion of data from the memory buffer to a buffer local to an audio controller ("controller buffer");
sending data in the controller buffer to an audio codec to render the first sound to the user; and
rendering the second sound to the user when an event is detected that needs to render a second sound to the user while the first sound is playing, including
in response to detecting the event that needs to render the second sound to the user while the first sound is playing, determining whether finishing rendering audio data currently in the controller buffer will cause a significant delay for rendering the second sound to the user,
if the determining indicates that finishing rendering audio data currently in the controller buffer will not cause a significant delay for rendering the second sound to the user, finishing rendering the audio data currently in the controller buffer, otherwise, re-fetching from the memory controller audio data which is previously buffered in the controller buffer but has not yet been transmitted to the audio codec, including buffering the re-fetched data to the controller buffer, the data to be re-fetched including data for the second sound, and
sending the re-fetched data from the controller buffer to the audio codec to render the second sound to the user.

12. The method of claim 11, wherein re-fetching the audio data comprises:
obtaining an indication of which audio frame in the memory controller is being sent to the audio codec from the audio controller;
calculating a remix offset in the memory controller at which audio data from the first sound and audio data for the second sound start being remixed;
remixing the audio data for the first sound and the audio data for the second sound and placing the remixed audio data in the memory buffer starting at the remix offset;
signaling the audio controller to re-fetch the remixed audio data from the memory buffer; and
re-fetching the remixed audio data from the memory buffer to the controller buffer.

13. The method of claim 12, wherein placing the remixed audio data in the memory buffer comprises:
checking whether the value of the remix offset is larger than a threshold, the threshold being obtained based at least in part on the indication of which audio frame in the memory controller is being sent to the audio codec from the audio controller; and
if not, adjusting the remix offset to be equal to the threshold.

14. The method of claim 11, further comprising dynamically adjusting a pre-fetch window size ("PFWS") while playing the first sound and/or the second sound, the PFWS being the maximum amount of data the audio controller is allowed to have in the controller buffer.

15. The method of claim 14, wherein dynamically adjusting the PFWS comprises:
determining whether to increase or decrease the current PFWS; and
if the current PFWS needs to increase,
obtaining the maximum size of the controller buffer,
if a new PFWS is larger than the maximum size of the controller buffer, setting the new PFWS to be equal to the maximum size of the controller buffer, and
finishing rendering audio data currently in the controller buffer and reading a larger amount of data from the memory buffer to fill the controller buffer to the new PFWS.

16. The method of claim 15, further comprising:
if the current PFWS needs to decrease,
finishing rendering audio data currently in the controller buffer; and
reading a smaller amount of data from the memory buffer to fill the controller buffer to the new PFWS.

17. The method of claim 15, further comprising:
if the current PFWS needs to decrease,
invalidating audio data currently in the controller buffer but outside of a new PFWS; and
reading a smaller amount of data from the memory buffer to fill the controller buffer to the new PFWS.

18. An article comprising a machine-readable medium that contains instructions, which when executed by a processing platform, cause said processing platform to perform operations for playing audio to a user in a computing system, the operations comprising:
receiving a request for playing a first sound from the user;
buffering at least a portion of the first sound in a buffer in a memory of the computing system ("memory buffer");
fetching a portion of data from the memory buffer to a buffer local to an audio controller ("controller buffer");
sending data in the controller buffer to an audio codec to render the first sound to the user; and
rendering the second sound to the user when an event is detected that needs to render a second sound to the user while the first sound is playing, including
in response to detecting the event that needs to render the second sound to the user while the first sound is playing, determining whether finishing rendering audio data currently in the controller buffer will cause a significant delay for rendering the second sound to the user,
if the determining indicates that finishing rendering audio data currently in the controller buffer will not cause a significant delay for rendering the second sound to the user, finishing rendering the audio data currently in the controller buffer, otherwise, re-fetching from the memory controller audio data which is previously buffered in the controller buffer but has not yet been transmitted to the audio codec, including buffering the re-fetched data to the controller buffer, the data to be re-fetched including data for the second sound, and
sending the re-fetched data from the controller buffer to the audio codec to render the second sound to the user.

19. The article of claim 18, wherein operations for re-fetching the audio data comprises:
obtaining an indication of which audio frame in the memory controller is being sent to the audio codec from the audio controller;
calculating a remix offset in the memory controller at which audio data from the first sound and audio data for the second sound start being remixed;

remixing the audio data for the first sound and the audio data for the second sound and placing the remixed audio data in the memory buffer starting at the remix offset;
signaling the audio controller to re-fetch the remixed audio data from the memory buffer; and
re-fetching the remixed audio data from the memory buffer to the controller buffer.

20. The article of claim 19, wherein operations for placing the remixed audio data in the memory buffer comprises:
checking whether the value of the remix offset is larger than a threshold, the threshold being obtained based at least in part on the indication of which audio frame in the memory controller is being sent to the audio codec from the audio controller; and
if not, adjusting the remix offset to be equal to the threshold.

21. The article of claim 18, wherein the operations further comprise dynamically adjusting a pre-fetch window size ("PFWS") while playing the first sound and/or the second sound, the PFWS being the maximum amount of data the audio controller is allowed to have in the controller buffer.

22. The article of claim 21, wherein operations for dynamically adjusting the PFWS comprises:
determining whether to increase or decrease the current PFWS; and
if the current PFWS needs to increase,
obtaining the maximum size of the controller buffer,
if a new PFWS is larger than the maximum size of the controller buffer, setting the new PFWS to be equal to the maximum size of the controller buffer, and
finishing rendering audio data currently in the controller buffer and reading a larger amount of data from the memory buffer to fill the controller buffer to the new PFWS.

23. The article of claim 22, wherein the operations further comprise:
if the current PFWS needs to decrease,
finishing rendering audio data currently in the controller buffer; and
reading a smaller amount of data from the memory buffer to fill the controller buffer to the new PFWS.

24. The article of claim 22, wherein the operations further comprise:
if the current PFWS needs to decrease,
invalidating audio data currently in the controller buffer but outside of a new PFWS; and
reading a smaller amount of data from the memory buffer to fill the controller buffer to the new PFWS.

* * * * *